(12) United States Patent
Gremaud

(10) Patent No.: US 10,931,997 B2
(45) Date of Patent: Feb. 23, 2021

(54) METHOD AND DEVICE TO TRANSFER A VIDEO STREAM BETWEEN A HOST DEVICE AND AN ELECTRONIC DESCRAMBLING DEVICE

(71) Applicant: NAGRAVISION S.A., Cheseaux-sur-Lausanne (CH)

(72) Inventor: Fabien Gremaud, Chatel-St-Denis (CH)

(73) Assignee: NAGRAVISION S.A., Cheseaux-sur-Lausanne (CH)

(*) Notice: Subject to any disclaimer, the term of this patent is extended or adjusted under 35 U.S.C. 154(b) by 128 days.

(21) Appl. No.: 15/755,344

(22) PCT Filed: Aug. 29, 2016

(86) PCT No.: PCT/EP2016/070274
§ 371 (c)(1),
(2) Date: Feb. 26, 2018

(87) PCT Pub. No.: WO2017/036996
PCT Pub. Date: Mar. 9, 2017

(65) Prior Publication Data
US 2018/0249198 A1 Aug. 30, 2018

(30) Foreign Application Priority Data
Sep. 1, 2015 (EP) .................................. 15183327

(51) Int. Cl.
*H04N 7/167* (2011.01)
*H04N 21/418* (2011.01)
(Continued)

(52) U.S. Cl.
CPC ... *H04N 21/4181* (2013.01); *H04N 21/26613* (2013.01); *H04N 21/43607* (2013.01);
(Continued)

(58) Field of Classification Search
CPC .................................................. H04N 21/4181
(Continued)

(56) References Cited

U.S. PATENT DOCUMENTS 6,064,676 A * 5/2000 Slattery ............ H04N 21/23608
370/412
6,463,059 B1 * 10/2002 Movshovich ..... H04L 29/06027
370/389

(Continued)

FOREIGN PATENT DOCUMENTS

EP 2 804 388 11/2014
EP 2804388 A1 * 11/2014 ........... H04N 21/418

OTHER PUBLICATIONS

"Universal Serial Bus Device Class Definition for Video Devices: MPEG-2 TS Playload", Retrieved from the Internet: URL: http://whereabouts.eecs.umich.edu/wiki/lib/exe/fetch.php?id=mscontext_entry_1&cache=cache&media=usb_video_payload_mpeg-2_tx_1.1.pdf, XP 055242243, (Jun. 1, 2005).

(Continued)

Primary Examiner — Wasika Nipa
Assistant Examiner — Samuel Ambaye
(74) Attorney, Agent, or Firm — Oblon, McClelland, Maier & Neustadt, L.L.P.

(57) ABSTRACT

A method to transfer a video stream from a host device comprising a controller configured for bulk transfers to a descrambling device, comprises: forming a chain out transfer comprising a chain out header linked with multiple chain out descriptors, the first chain out descriptor pointing to an out description packet containing at least one producer ID, the second and subsequent chain out descriptor pointing to chunks from the video stream, the last chain out descriptor being configured to generate an interrupt; forming a chain in transfer comprising a chain in header linked with a plurality of chain in descriptors, each chain in descriptor pointing to (Continued)

a descrambled chunk; requesting the controller to process the chain; receiving the description packet by the descrambling device and using key data associated with the chunks to descramble them; receiving by the controller the descrambled chunks and triggering an interrupt on the last chunk.

13 Claims, 5 Drawing Sheets

(51) Int. Cl.
    *H04N 21/436*     (2011.01)
    *H04N 21/4405*     (2011.01)
    *H04N 21/266*     (2011.01)
    *H04N 21/8352*     (2011.01)
    *H04N 21/84*     (2011.01)

(52) U.S. Cl.
    CPC ..... *H04N 21/4405* (2013.01); *H04N 21/8352* (2013.01); *H04N 21/84* (2013.01)

(58) Field of Classification Search
    USPC .......................................................... 380/228
    See application file for complete search history.

(56) References Cited

U.S. PATENT DOCUMENTS

2005/0038939 A1\*   2/2005   Lee .................... H04N 1/00204
                                                          710/33
2013/0308923 A1\*   11/2013   Nakashika ........... H04N 9/8042
                                                          386/248

OTHER PUBLICATIONS

International Search Report Issued in International Application No. PCT/EP2016/070274 dated Nov. 21, 2016.
Written Opinion Issued in International Application No. PCT/EP2016/070274 dated Nov. 21, 2016.

\* cited by examiner

METHOD AND DEVICE TO TRANSFER A VIDEO STREAM BETWEEN A HOST DEVICE AND AN ELECTRONIC DESCRAMBLING DEVICE

INTRODUCTION

Multimedia contents may be transmitted in various ways from a provider to an end user. In order to protect this valuable content, scrambling (encrypting) may be performed to the content so that only authorized persons can have access to it.

Reception of the scrambled multimedia content may be done on different devices such as a personal computer, a tablet, a smartphone, or other devices that may not have the necessary descrambling (decrypting) capabilities to access the content.

BRIEF DESCRIPTION OF THE INVENTION

In one embodiment, an electronic descrambling device may be connected to a host device and configured to descramble multimedia content. An electronic descrambling device is a portable module comprising electronic chips connected via a communication port with the host device. It is generally called "dongle". The electronic chip comprises a descrambling engine and memories to temporary store the incoming data chunk. According to a particular embodiment, the electronic descrambling device is a USB dongle and the video stream is a MPEG stream.

Currently, transfer protocols to an electronic descrambling device are not adapted to the continuous exchange of data at a bit rate compatible with video streams. They have been designed to accommodate the transfer of storage data. To address this problem, it is proposed a method to descramble at least one video stream originating from at least one producer, having a producer ID, by an electronic descrambling device connected to a host device, said host device comprising a controller comprising a bulk pipe out and a bulk pipe in transfer, comprising, at the host device:
   for each producer, defining a chunk of data from the video stream,
   forming a chain of out transfer, the chain of out transfer comprising a chain out header (oqH) linked with a plurality of chain out descriptors (oqTD), the first chain out descriptor pointing to a out description packet containing the at least one producer ID, the second and subsequent chain out descriptor pointing to the chunk of data, each chunk of data being of a particular producer,
   forming, by the host device, a chain of in transfer, the chain of in transfer comprising a chain in header (iqH) linked with a plurality of chain in descriptors (iqTD), each chain in descriptor pointing to a descrambled chunk of data, and the last chain in descriptor being configured to generate an interrupt,
   transferring the chain of out transfer by the controller to the electronic descrambling device, thus transferring to the electronic descrambling device the scrambled data chunk,
at the electronic descrambling device:
   receiving the description packet by the electronic descrambling device and identifying by the electronic descrambling device key data associated with the at least one chunk,
   using the key data to descramble the scrambled data chunk,
   returning the descrambled data to the host device,
at the host device:
   receiving the chain of in transfer by the controller, thus waiting from the electronic descrambling device the chunk descrambled data,
   storing the received descrambled data chunk at an address indicated by the correspond chain in descriptor (iqTD),
   triggering an interrupt by the reception of the last descrambled chunk.

The format of the multimedia content is preferably an MPEG stream. An MPEG stream typically comprises several sub-streams having each a different packet identifier (PID). Examples of sub-streams are audio, video, data, and caption. Sub-streams pertain to the same multimedia content from a channel. A MPEG stream can comprise several channels, the description of each sub-stream being located into the Program Map Table (PMT). As far as the scrambling of data is concerned, the keys loaded into the electronic descrambling device are dedicated to a sub-stream and identified using the producer ID and the PID.

BRIEF DESCRIPTION OF THE FIGURES

The following detailed description will be better understood thanks to the attached figures in which.

DETAILED DESCRIPTION

Figure 1:
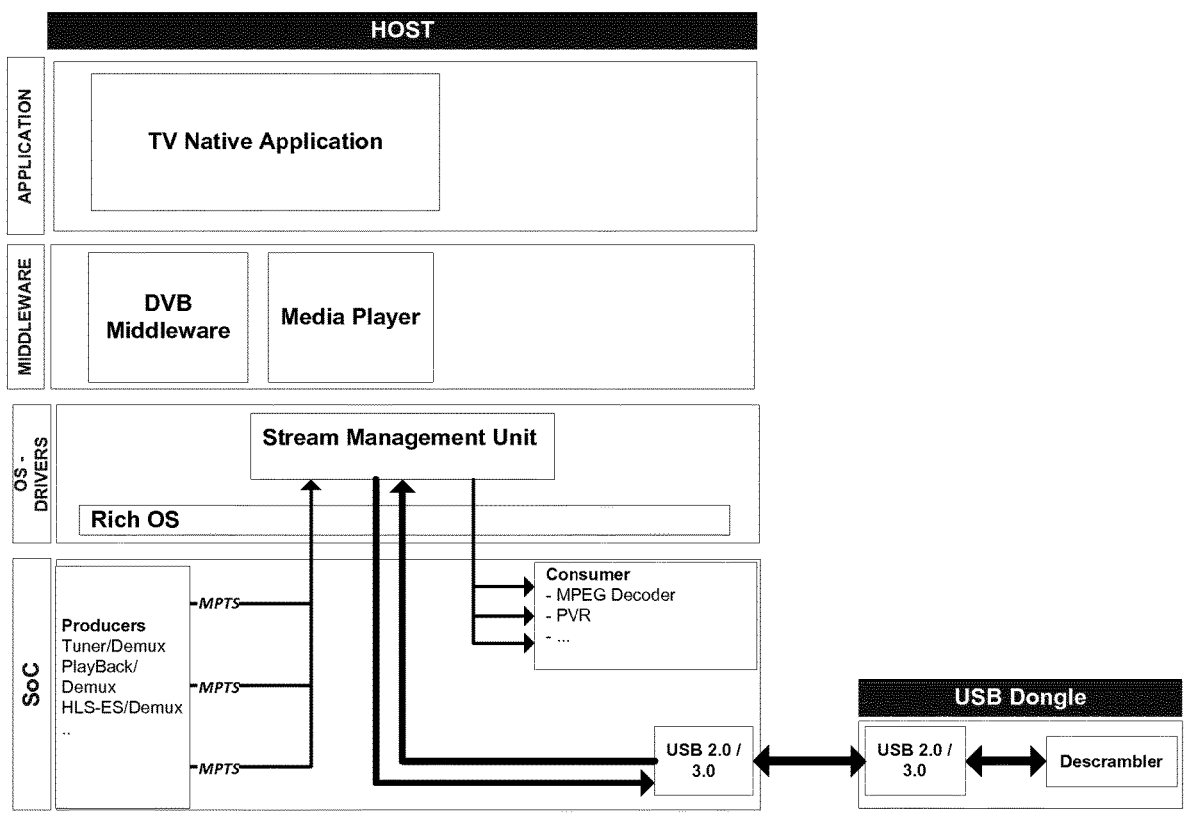
FIG. 1 illustrates a block diagram of the host device in connection with the electronic descrambling device.

FIG. 1 illustrates the different components of one embodiment of the invention. The Host (which may be for example a home multimedia receiver) comprises various layers. The top layer may be the TV Native Application. A Middleware layer may include a DVB Middleware and the Media Player modules. The OS Drivers may be lower layers containing the Stream Management Unit in charge of executing one embodiment of the invention. The communication layer SoC may be configured for the handling of the MPEG streams and may include the communication module (USB controller) with the electronic descrambling device. In the following description, the electronic descrambling device will be named "dongle".

Figure 2:
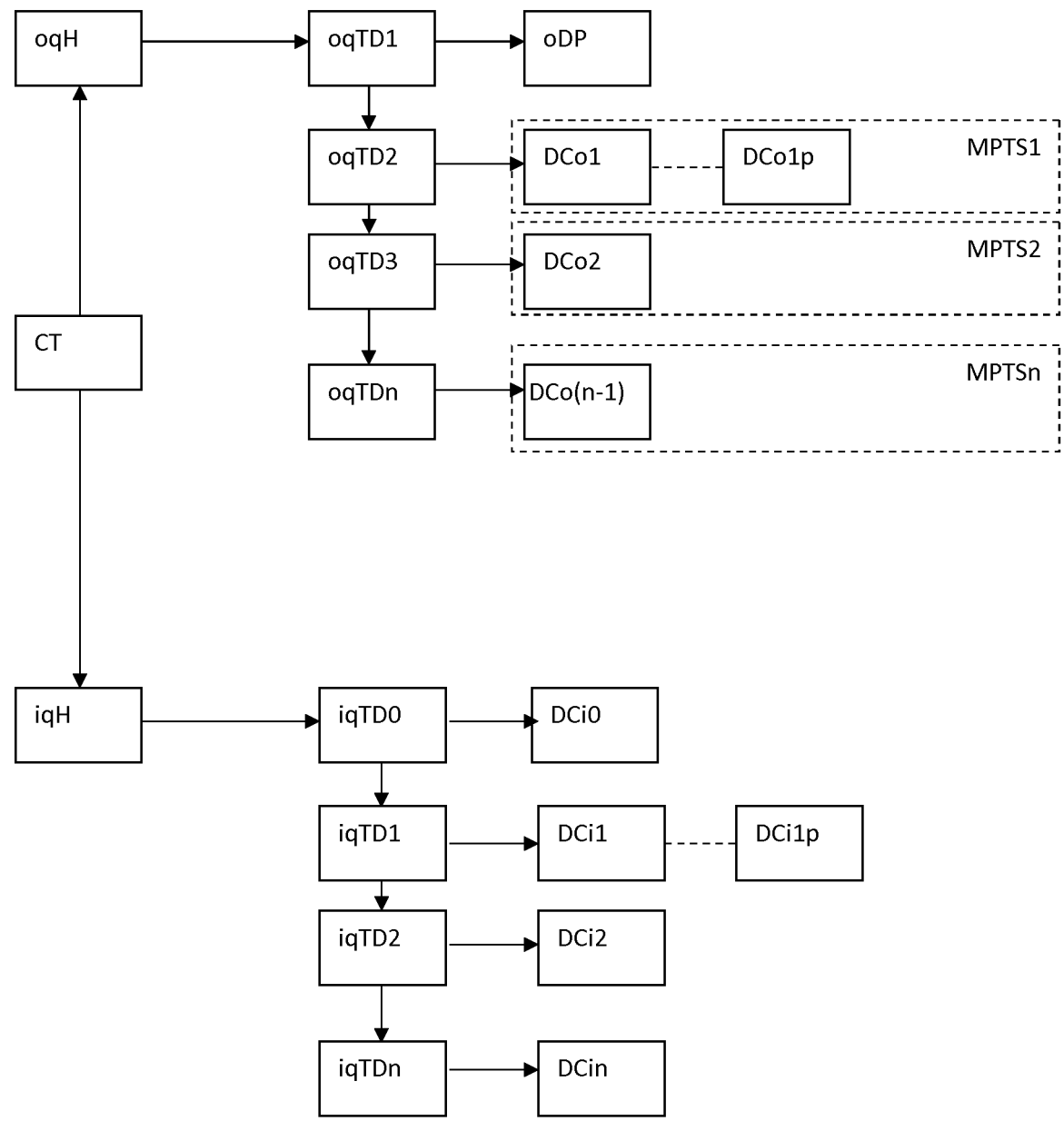
FIG. 2 illustrates the format of the chain in and out queue according one example of the invention.

FIG. 2 describes one example of the formatting of a chain for a controller, in particular a USB controller. The application layer, in the host device, receives the MPEG stream (or a plurality of MPEG streams) and formats the chain in and chain out (CT) in order to instruct the USB controller. The chain out starts with a chain out header (oqH) playing the role of the link with the chain out descriptors (oqTD1 to oqTDn). The first chain out descriptor (oqTD1) is pointing to the out description packet containing the at least one producer ID. The application layer is in charge of composing the chains and extracts the producer ID from the MPEG stream. The application layer then loads the producer ID into the out description packet (oDP).

The first chain out descriptor (odTD1) points to the second chain out descriptor (odTD2). This second chain out descriptor (and the following chain out descriptors) points to the chunk of data extracted from the MPEG stream. The application layer handling the MPEG stream splits the stream into chunks of data and loads them into the buffer memory at an address loaded into the chain out descriptor.

The application layer can load more than one chunk into the chain in accordance with the maximum number of chain out descriptors handled by the chain.

Figures 3A, 3B:
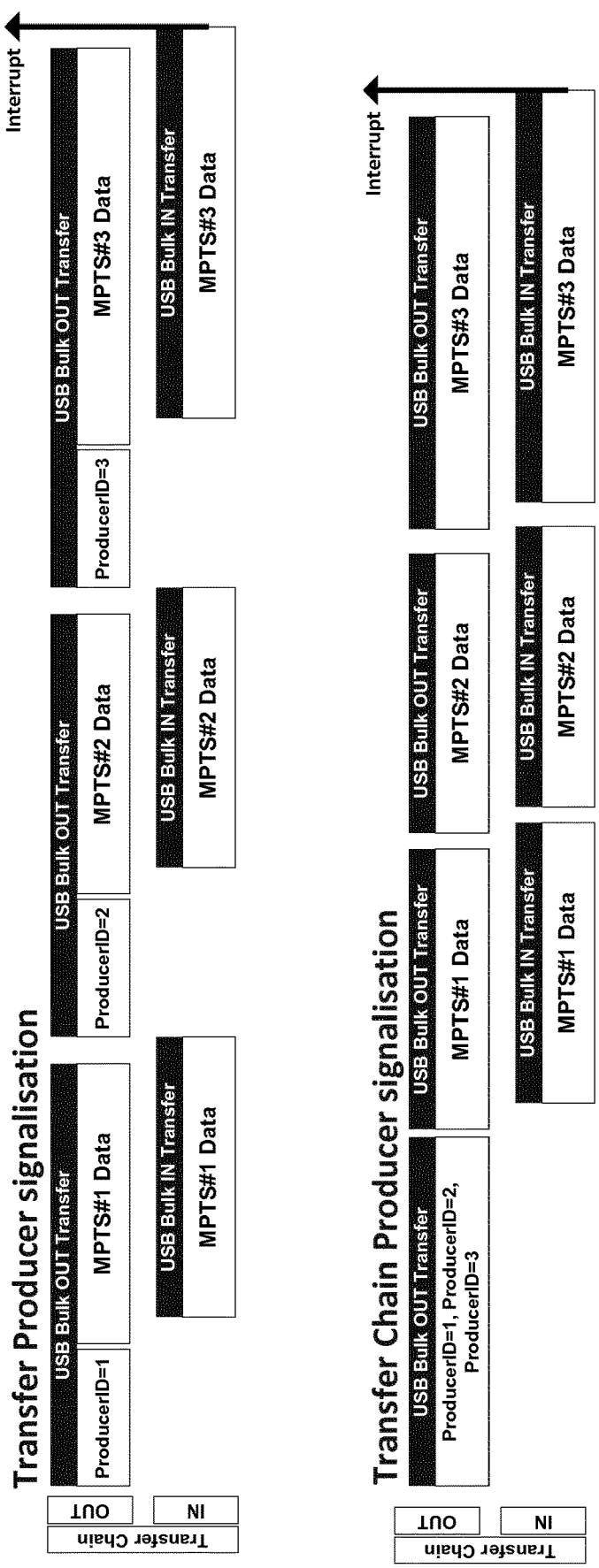
FIG. 3a illustrates a first embodiment of the transfer chain.
FIG. 3b illustrates a second embodiment of the transfer chain.

According to the example of FIGS. 3a and 3b, when the application layer is processing more than one MPEG stream, the producer ID of each stream is loaded into the out descriptor packet (oDP). This is illustrated by the FIG. 3b in which three streams are processed and the producer ID1, the producer ID2 and the producer ID3 are loaded into the out descriptor packet.

The MPTS1 Data, forming the first data chunk, is then pointed by the second chain out descriptor (oqTD2), the MPTS2 Data, forming the second data chunk, is then pointed by the third chain out descriptor (oqTD) and the MPTS3 Data, forming the third data chunk, is then pointed by the fourth chain out descriptor (oqTD1).

The application layer also configures the chain in. The chain in and chain out are connected together and form a single event. Once configured, the application layer calls the USB controller to execute the chain operations. The chain in is a chain starting with a chain in header (iqH) linked with a plurality of chain in descriptors (iqTD). Each chain in descriptor points to a chunk of data resulting from the processing (i.e. descrambling) by the USB dongle.

The last chain in descriptor (iqTDn) is configured to trigg an interrupt when the USB controller receives the last chunk of processed data by the USB dongle.

Each chain in descriptor is associated with a MPEG stream. Depending of the implementation of the USB controller, the size of data chunk can vary. According to one example, a data chunk comprises a plurality of packets. Each packet represents a USB transaction. According to one example of forming a chain of packets, each packet has a size equal to the nominal size (e.g. 512 Bytes), except the last packet. The non-nominal size of the packet indicates that this is the last packet of the data chunk. This is illustrated in the FIG. 2 by the box DCo1 to DCop. The last packet of the data chunk has a size different than the nominal size, thus indicating that it is the last packet of the data chunk.

According to another example of realization, the chain out transfer is configured such as the producer ID is placed in the data chunk, into the first packet. The producer ID is placed in a data header preceding the data chunk and both are concatenated by the USB controller and transferred in a single USB transaction.

This is the case illustrated at the FIG. 3A. The first chain out descriptor points to at least two packets, one being the packet containing the producer ID and the second one (and further ones) being the packets of the data chunk of the MPEG stream. The chain in is the same as in the first example.

When the USB controller is supporting both 3a and 3b, 3a and 3b share a common field in their respective header allowing the dongle USB controller to differentiate between a 3a and a 3b chain of descriptor. This allows a host to choose the most efficient transfer for a specific processing.

Once the chain out and in is configured, the USB controller receives a signal from the application layer and the chain is processed. The transfer to the USB dongle is executed by the USB controller for example using the bulk in and out transfer. The USB controller activates and transfers the data as instructed.

The USB dongle receives the chain out and retrieves the producer ID from the corresponding packet. With the producer ID, the USB dongle can retrieve the key data corresponding to the data chunk. The USB dongle receives through another USB channel, key data related to the MPEG streams to proceed.

The USB dongle comprises a key table populated with the key data for each MPEG stream. According to a first example, the key table comprises for each producer ID, the key data related to this producer. Preferably, the key data comprises an odd and an even key, one being currently used and the other one ready for the next key change. A bit in the chunk data indicates the current key to be used.

This key table can further contain a packet identifier PID (or program ID) in case one producer ID is associated with a plurality of key data. The table will be then as follows:

| Producer ID | PID ID | Key odd | Key even |
| --- | --- | --- | --- |
| PRID1 | PID12 | Value | Value |
| PRID1 | PID15 | Value | Value |
| PRID2 | PID3 | Value | Value |
| PRID3 | PID10 | Value | Value |

An example of the value of the keys is a 128 bits pseudorandom number.

In the above example, the producer PRID1 is associated with an MPEG stream comprising two sub-streams needing key data to be descrambled. Each sub-stream is identified by a PID identifier or program ID (in our example PID12 and PID15), each sub-stream being associated with different key data.

The key table is received by the host device from an authorization server or can be extracted from one or more MPEG stream. According to an embodiment of the invention, the USB dongle comprises the key(s) necessary to decrypt the encrypted key data. The encrypted key data can be in the form of ECM (Entitlement Control Message) extracted from the MPEG stream by the host and transferred to the USB dongle.

According to another embodiment, the host can request a license file from an authorization server and can pass the license file to the USB dongle once received from the authorization server. The license file is decrypted and the key data are used to populate the key table. The USB dongle can comprise a personal key to decrypt the encrypted key data (license or ECM).

Once the USB dongle has descrambled the data chunk using the corresponding key data, the descrambled data chunk are sent to the host device, in particular to the USB controller. The latter stores the received data at the address indicated in the first chain out descriptor. As a consequence, a data chunk DCo1 is transferred by the USB controller to the USB dongle and when the USB dongle returns the data chunk DCi1, the USB controller stores it at the address indicated by the first chain in descriptor iqTD1.

When the last data chunk has been stored in the chain in queue the USB controller initiates an interrupt to inform the application layer.

The application layer can then retrieve the descrambled data chunk and can deliver it to a consumer such as a multimedia player.

Figure 4:
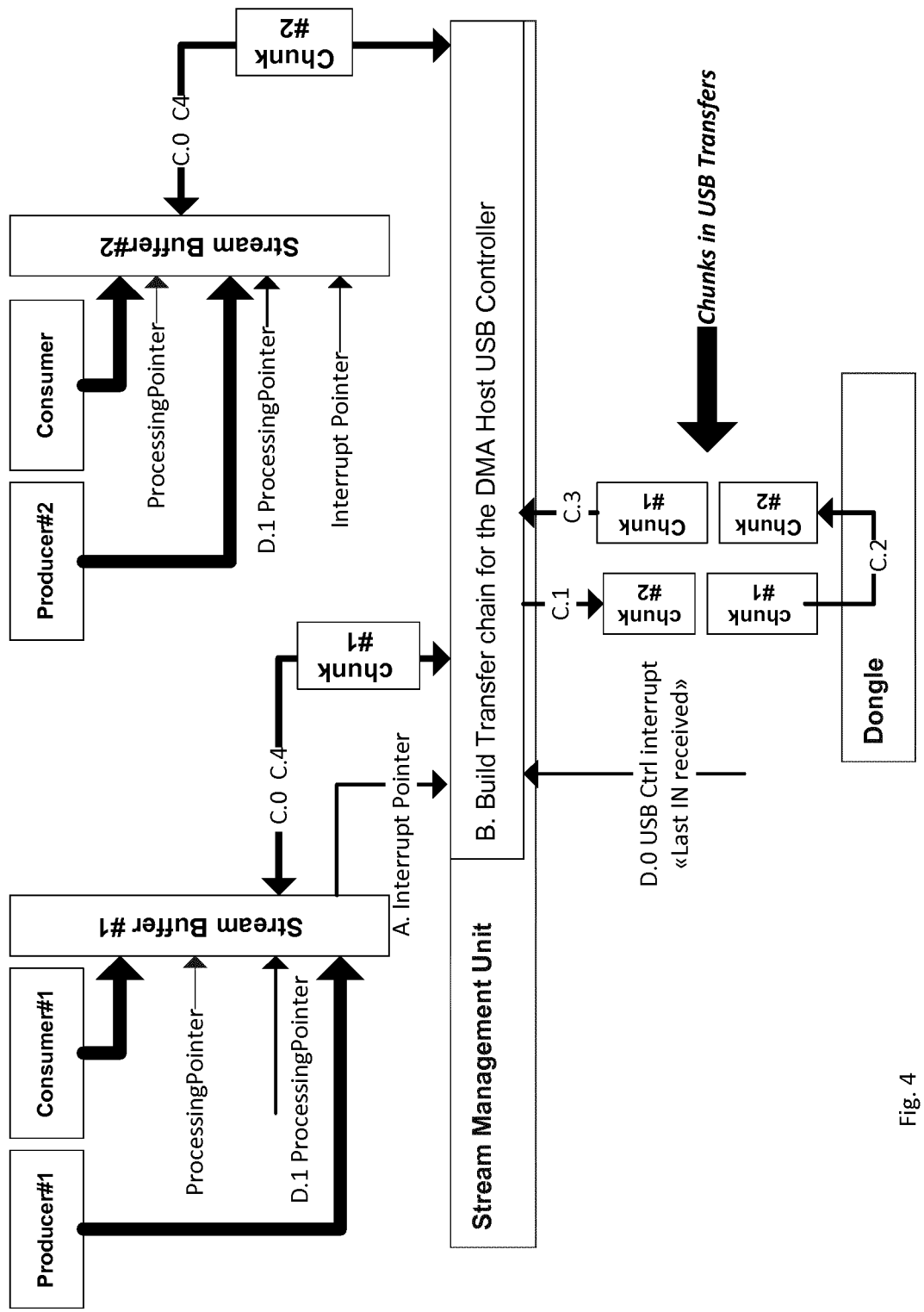
FIG. 4 illustrates the management of the queues in a buffer.

It is to be noted that a MPEG stream is loaded into a stream buffer as illustrated at the FIG. 4. The host can process several MPEG streams in parallel and the FIG. 4 illustrates two MPEG streams from two producers (Producer #1, Producer #2). The application layer is in charge of the management of the Stream Buffer #1 and #2. A buffer is dedicated to one producer and the application layer mainly deals with the pointers of the buffer. The buffer is filled with data coming from an MPEG source. When the chain in and chain out are defined, the USB controller process the data chunk (chunk #1 for the Producer #1 and chunk #2 for the Producer #2) so that more than one MPEG source can be processed in parallel. The consumer is using the buffer architecture and handles its own pointers to the descrambled data.

According to the illustrated example, the stream buffer is the same for the scrambled and descrambled data. However, in accordance with another example, the buffer for the scrambled data is independent to the buffer of the descrambled data. In this case, the USB controller, while receiving the descrambled chunk from the USB dongle, stores them into the in buffer.

This formatting and handling of chain buffer is particularly adapted to USB 2.0 transmission.

However, other protocol layer can be used to transfer the data based on stream buffer and chain pointer and descriptor as described above.

Figure 5:
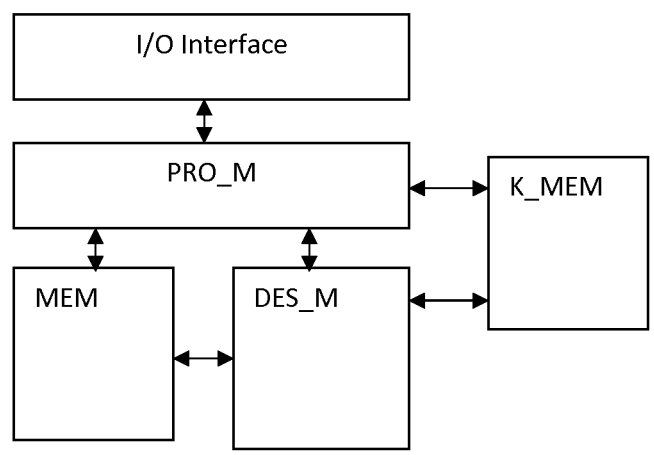
FIG. 5 illustrates an example of the modules in a electronic descrambling device.

FIG. 5 illustrates a block diagram of the dongle. The dongle comprises four main blocks, the I/O interface block, the processing block PRO_M, the memory MEM and the descrambling module DES_M.

The I/O interface is connectable with the host device to receive the data via the dedicated USB signals. The processing block PRO_M is in charge of directing the flow of data entering and exiting via the I/O Interface to the memory MEM. The memory acts as a buffer memory and the pointers (in and out pointers) are handled by the processing block. The data chunks are stored in the memory and the pointer for this chunk is passed to the descrambling module. The processing block also keep track of the producer ID for said chunk of data and loads the related keys into the descrambling module. The descrambling module, when the chunk is descrambled, stores the descrambled chunk and sends a signal to the processing module. The pointer is then passed to the I/O interface which routes the descrambled chunk into the I/O Interface. The processing block is in charge of executing the chain's instruction. The structure of the chain is known by the processing block and the elements of the chain extracted so that the processing block knows for each data chunk, which producer ID is related to. For that purpose, the processing block is connected with a key memory K_MEM to store the keys received from the host device via the USB Interface.

According to another embodiment, the keys memory K_MEM is directly connected to the descrambling module and this module, when the processing block instructs to descramble a data chunk identified by producer ID, loads the keys related to said producer ID in the key registers.

Although an overview of the inventive subject matter has been described with reference to specific example embodiments, various modifications and changes may be made to these embodiments without departing from the broader spirit and scope of embodiments of the present invention. For example, various embodiments or features thereof may be mixed and matched or made optional by a person of ordinary skill in the art. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

The invention claimed is:

1. A method to descramble at least one video stream, originating from at least one producer having a producer ID, by an electronic descrambling device connected to a host device, said host device comprising a controller configured for bulk out and bulk in transfers, comprising:
   in the host device,
      for the at least one producer, defining multiple chunks of data from the video stream;
      forming a chain out transfer structure, the chain out transfer structure comprising a chain out header linked with a plurality of chain out descriptors, a first chain out descriptor pointing to an out description packet containing the producer ID of the at least one producer, second and subsequent chain out descriptors pointing to respective scrambled chunks of data, each scrambled chunk of data corresponding to the producer ID of the first chain out descriptor and originating from the at least one producer associated with the producer ID of the first chain out descriptor;
      transferring the chain out transfer structure, including the chain out header and the plurality of chain out descriptors pointing respectively to the producer ID and the respective scrambled chunks of data, by the controller to the electronic descrambling device;
   at the electronic descrambling device,
      receiving the chain out transfer structure, including the out description packet by the electronic descrambling device and identifying by the electronic descrambling device key data associated with the scrambled chunks of data;
      using the key data to descramble the scrambled chunks of data;
      returning the descrambled chunks of data to the host device;
   at the host device,
      receiving a chain in transfer structure by the controller, from the electronic descrambling device, the chain in transfer structure including a chain in header linked with a plurality of chain in descriptors, each chain in descriptor pointing to a descrambled chunk of data, and a last chain in descriptor being configured to generate an interrupt;
      storing each of the received descrambled chunks of data from the chain in transfer structure at an address indicated by the corresponding chain in descriptor; and
      triggering an interrupt in response to reception of the last chain in descriptor.

2. The method of claim 1, wherein the at least one video stream is compliant with a Moving Picture Experts Group (MPEG) standard.

3. The method of claim 1, wherein the electronic descrambling device is a universal serial bus dongle.

4. The method of claim 2, wherein the at least one MPEG stream comprises a Multi Program transport stream (MPTS) comprising a plurality of sub-streams, each having a program ID, said method further comprising
inserting in the out description packet a program ID of each sub-stream, the chain in transfer structure containing at least one chunk of data associated with each program ID; and
informing a media player that the at least one chunk of data of the chain in transfer structure is descrambled.

5. The method of claim 2, wherein the at least one MPEG stream is formed by a Single Program Transport Stream (SPTS) having one packet identifier (PID).

6. The method of claim 4, wherein at least a first and a second MPEG stream are transferred to the electronic descrambling device, each having a different producer ID, the method further comprising inserting in the first chain out descriptor the producer ID of the first stream and the producer ID of the second stream; and
inserting in the second chain out descriptor a chunk of data from the first MPEG stream and in a third chain out descriptor a chunk of data from the second MPEG stream.

7. The method of claim 5, wherein the chain out transfer structure contains different types of producers selected among SPTS, Multi Program transport stream (MPTS), or raw MPEG, each identified using an associated producer ID.

8. The method of claim 1, wherein the key data are transferred to the electronic descrambling device through a dedicated channel, each key data being dedicated to one packet identifier (PID), the key data being used with a chunk of data corresponding to the respective PID.

9. The method of claim 1, wherein each descrambled chunk of data is re-encrypted by a channel key shared between the host device and the electronic descrambling device.

10. A host device having an interface with an electronic descrambling device to transfer at least one video stream, originating from at least one producer having a producer ID, from the host device to the interface with the electronic descrambling device, said host device comprising:
a memory storing instructions; and
a processing block configured to execute the instructions stored in the memory to perform bulk out and bulk in transfers, said processing block being configured to
for the at least one producer, define multiple chunks of data from the video stream;
form a chain out transfer structure, the chain out transfer structure comprising a chain out header linked with a plurality of chain out descriptors, a first chain out descriptor pointing to an out description packet containing the producer ID of the at least one producer, second and subsequent chain out descriptors pointing to respective scrambled chunks of data, each scrambled chunk of data corresponding to the producer ID of the first chain out descriptor and originating from the at least one producer associated with the producer ID of the first chain out descriptor;
transfer the chain out transfer structure, including the chain out header and the plurality of chain out descriptors pointing respectively to the producer ID and the respective scrambled chunks of data, to the electronic descrambling device;
receive a chain in transfer structure from the electronic descrambling device, the chain in transfer structure including a chain in header linked with a plurality of chain in descriptors, each chain in descriptor pointing to a descrambled chunk of data, and a last chain in descriptor being configured to generate an interrupt;
store each of the received descrambled chunks of data from the chain in transfer structure at an address indicated by the corresponding chain in descriptor; and
trigger an interrupt in response to reception of the last chain in descriptor.

11. The host device of claim 10, wherein the video stream is compliant with a Moving Picture Experts Group (MPEG) standard and comprises a Multi Program transport stream (MPTS) comprising a plurality of sub-streams each having a packet identifier (PID), the processing block being further configured to insert in the out description packet a program ID of each program, the chain in transfer structure containing at least one chunk of data associated with each program ID, inform a media player that the at least one chunk of data of the chain in transfer structure is descrambled.

12. The host device of claim 10, wherein a first and a second video stream are transferred to the electronic descrambling device, each having a different producer ID, the processing block being further configured to insert in the first chain out descriptor the producer ID of the first stream and the producer ID of the second stream; insert in the chain out transfer structure a first consumer identification of the first stream and a second consumer identification of the second stream; insert in the chain out transfer structure at least two chunks of data, one of the first stream and one of the second stream; and inform a first consumer and a second consumer that the chunks of data are descrambled.

13. The host device of claim 10, wherein the processing block is further configured to decrypt each descrambled chunk of data with a channel key shared between the host device and the electronic descrambling device.

* * * * *